US007190496B2

(12) United States Patent
Klug et al.

(10) Patent No.: US 7,190,496 B2
(45) Date of Patent: Mar. 13, 2007

(54) ENHANCED ENVIRONMENT VISUALIZATION USING HOLOGRAPHIC STEREOGRAMS

(75) Inventors: Michael A. Klug, Austin, TX (US); Mark E. Holzbach, Austin, TX (US); Craig Newswanger, Austin, TX (US)

(73) Assignee: Zebra Imaging, Inc., Austin, TX (US)

( * ) Notice: Subject to any disclaimer, the term of this patent is extended or adjusted under 35 U.S.C. 154(b) by 0 days.

(21) Appl. No.: 10/899,365

(22) Filed: Jul. 26, 2004

(65) Prior Publication Data

US 2005/0052714 A1   Mar. 10, 2005

Related U.S. Application Data

(60) Provisional application No. 60/489,680, filed on Jul. 24, 2003.

(51) Int. Cl.
*G03H 1/26* (2006.01)
(52) U.S. Cl. .............................. 359/23; 359/35; 359/9; 345/9
(58) Field of Classification Search .................... 359/1, 359/9, 15, 23, 28, 35; 345/7–9; 715/773
See application file for complete search history.

(56) References Cited

U.S. PATENT DOCUMENTS

| 5,781,229 A | 7/1998 | Zediker et al. ............... 348/51 |
| 6,084,587 A | 7/2000 | Tarr et al. .................... 345/419 |
| 6,191,796 B1 | 2/2001 | Tarr ............................ 345/581 |
| 6,195,184 B1 | 2/2001 | Chao et al. .................... 359/32 |
| 6,211,848 B1* | 4/2001 | Plesniak et al. ............. 345/156 |
| 6,330,088 B1* | 12/2001 | Klug et al. .................... 359/23 |
| 6,417,638 B1 | 7/2002 | Guy et al. .................. 318/560 |
| 6,421,048 B1 | 7/2002 | Shih et al. .................. 345/419 |
| 6,552,722 B1 | 4/2003 | Shih et al. .................. 345/419 |
| 6,671,651 B2 | 12/2003 | Goodwin et al. ........... 702/152 |
| 6,930,811 B2 | 8/2005 | Brotherton-Ratcliffe et al. ......................... 359/222 |
| 2002/0027394 A1* | 3/2002 | Haitani ........................ 310/66 |
| 2004/0027394 A1* | 2/2004 | Schonberg .................. 345/850 |
| 2004/0050280 A1 | 3/2004 | Rodin et al. ................ 101/494 |
| 2005/0002074 A1* | 1/2005 | McPheters et al. ........... 359/15 |

OTHER PUBLICATIONS

W.Plesniak and M.Klug, "Tangible Holography: adding synthetic touch to 3D display", published in Proceedings of the IS&T/SPIE's Symposium on Electronic Imaging, Practical Holography XI, 1997.*

Wendy Plesniak and Michael Klug, "Tangible Holography: Adding Synthetic Touch to 3D Display," published in *Proceedings of the IS&T/SPIE's Symposium on Electronic Imaging, Practical Holography XI, 1997.*

* cited by examiner

*Primary Examiner*—Leonidas Boutsikaris
(74) *Attorney, Agent, or Firm*—Marc R. Ascolese; Campbell Stephenson Ascolese LLP

(57) ABSTRACT

Hologram production techniques can combine source data representing realistic information describing an environment with source data providing representational information describing a feature of the environment and/or some object interacting with the environment. The combined data is used to produce holograms, and particularly holographic stereograms including features that enhance the visualization of the environment depicted in hologram. A haptic interface can be used in conjunction with such holograms to further aid use of the hologram, and to provide an interface to secondary information provided by a computer and related to the images depicted in the hologram.

29 Claims, 6 Drawing Sheets

ENHANCED ENVIRONMENT VISUALIZATION USING HOLOGRAPHIC STEREOGRAMS

This application claims the benefit, under 35 U.S.C. §119 (e), of U.S. Provisional Application No. 60/489,680, filed Jul. 24, 2003, entitled "Integration of Digital Holograms With A Haptic Interface For Planning, Reconnaissance, And Intelligence Applications," and naming Michael A. Klug and Mark E. Holzbach as inventors. The above-referenced application is hereby incorporated by reference herein in their entirety.

BACKGROUND OF THE INVENTION

1. Field of the Invention

The present invention relates in general to the field of hologram production and, more particularly, to applications of and interfaces for use with holograms.

2. Description of the Related Art

Numerous devices and techniques have been disclosed for producing and displaying various types of holograms including one-step techniques, updateable techniques, techniques relying on fringe pattern calculation, and traditional object/reference beam interference techniques. Moreover, the subject matter of the scenes displayed in such holograms varies from simple demonstration scenes, to artistic renderings, to portraits, to scenes of complex devices or spaces, and beyond.

With the development of various digital holography techniques, hologram subject matter can include virtually any computer graphics rendered scene, and can be based on numerous different data sources such as CAD information, physical measurements, photographic data, and the like. Holograms are particularly useful for visualizing complex three-dimensional spaces that users cannot normally interact with directly, such as large or small scale environments, dangerous environment, and inaccessible environments. The term "environment" is generally meant to include any sort of environment in which a person might find himself and/or representations of such environments, e.g., terrain, bodies of water, maps, buildings, campuses, facilities, vehicles, and other larger-scale physical spaces. Environments can also refer to smaller scales, the subject matter being visualized can include the inside of a device or apparatus, interior features biological specimens, or even sub-micron environments (e.g., the interior of a cell or molecule).

Despite the fact that such environments can be displayed in holograms, the full potential of such visualization devices and techniques has not been realized for a number of reasons. Chief among those reasons are the absence of additional visualization tools and image enhancements to both ease the ability of a user to utilize what may be an unfamiliar visualization technique, and combine the environment visualization with related information.

Accordingly, it is desirable to have improved systems and methods for producing, displaying, and interacting with holograms to overcome the above-identified deficiencies in the prior art.

SUMMARY OF THE INVENTION

It has been discovered that hologram production techniques can combine source data representing realistic information describing an environment with source data providing representational information describing a feature of the environment and/or some object interacting with the environment. The combined data is used to produce holograms, and particularly holographic stereograms including features that enhance the visualization of the environment depicted in hologram. A haptic interface can be used in conjunction with such holograms to further aid use of the hologram, and to provide an interface to secondary information provided by a computer and related to the images depicted in the hologram.

Accordingly, one aspect of the present invention provides a method. First image data is combined with second image data. The first image data comprises realistic information describing an environment. The second image data comprises representational information describing at least one of a feature of the environment and an item interacting with the environment. Data for a plurality of hogels is rendered using combined first and second image data. A plurality of hogels is formed in a holographic recording material. The plurality of hogels are formed using the data for the plurality of hogels.

Another aspect of the present invention provides an apparatus. A light source produces a coherent beam. A beam splitter splits the coherent beam into an object beam and a reference beam. An object beam optical system directs the object beam to interfere with the reference beam at a holographic recording material. The object beam optical system includes a spatial light modulator for intensity modulating the object beam. A computer is coupled to the spatial light modulator and programmed to control delivery of a rendered image to the spatial light modulator. The rendered image includes first image data and second image data. The first image data comprises realistic information describing an environment, and the second image data comprises representational information describing at least one of a feature of the environment and an item interacting with the environment. A reference beam optical system directs the reference beam to interfere with the object beam at the holographic recording material.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present inventions may be better understood, and their numerous objects, features, and advantages made apparent to those skilled in the art by referencing the accompanying drawings.

DETAILED DESCRIPTION

Figure 1:
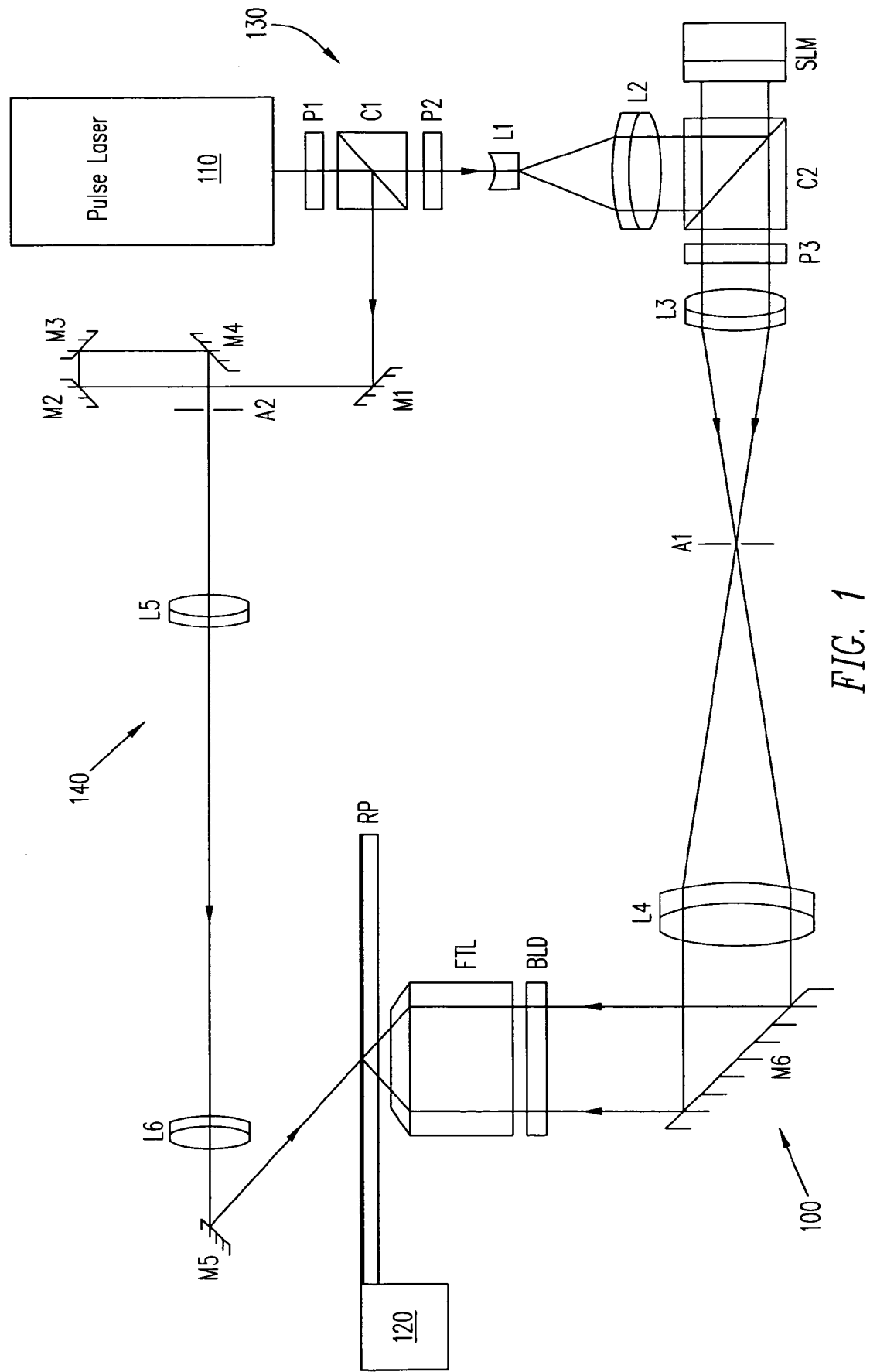
FIG. 1 is a schematic diagram a hologram production device using a pulsed laser.

The following sets forth a detailed description of the best contemplated mode for carrying out the invention. The description is intended to be illustrative of the invention and should not be taken to be limiting.

The holograms, devices for use with holograms, and related techniques described in the present application can generally make use of a variety of hologram production technologies including one-step techniques, updateable techniques, techniques relying on fringe pattern calculation, and traditional object/reference beam interference techniques.

One-step hologram (including holographic stereogram) production technology has been used to satisfactorily record holograms in holographic recording materials without the traditional step of creating preliminary holograms. Both computer image holograms and non-computer image holograms can be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is typically directed through a spatial light modulator (SLM) displaying a rendered image and then interfered with a reference beam. Examples of techniques for one-step hologram production can be found in U.S. Pat. No. 6,330,088 entitled "Method and Apparatus for Recording One-Step, Full-Color, Full-Parallax, Holographic Stereograms," naming Michael A. Klug, Mark E. Holzbach, and Alejandro J. Ferdman as inventors, ("the '088 patent") which is hereby incorporated by reference herein in its entirety.

In general, the techniques described in the '088 patent and other prior art techniques do not provide for both hologram recording and display in real-time. Moreover, these techniques are not designed to produce active or quickly-updateable displays. However, certain types of holographic recording materials can be used to updateably record holographic stereograms formed either from calculated fringe patterns displayed on specialized SLM, or from fringe patterns generated through interference of an object laser beam containing image information with a reference laser beam. Previously recorded holographic stereograms or component hogels are updated by erasing the stereograms or component hogels and recording updated stereograms or component hogels, or by recording updated stereograms or component hogels in a separate portion of the holographic recording material. Examples of such techniques for hologram production can be found in U.S. patent application Ser. No. 10/691,041 entitled "Active Digital Hologram Display," naming Michael A. Klug, Craig Newswanger, Qiang Huang, and Mark E. Holzbach as inventors, ("the '041 application") which is hereby incorporated by reference herein in its entirety.

While the hologram recording devices described, for example, in the '088 patent make use of both continuous wave (CW) and pulsed lasers, CW lasers can be less desirable for updateable holographic displays because they present certain limitations. Chief among those limitations is the relatively low output power of CW lasers which causes the hologram recorder to use relatively long exposure times (e.g., tens of milliseconds) for each hogel. During those exposure times, the entire hologram production system is particularly susceptible to mechanical vibration. Great effort is expended to reduce or eliminate the mechanical vibrations. Hologram recorders are typically located far away from sources of environmental vibration, such as outside traffic, building vibration, mechanical equipment, common appliances, human motion, acoustic noise, plumbing turbulence and air flow. Special devices, such as vibrationally-isolated optics tables, are typically used where environmental vibration sources cannot be sufficiently reduced or eliminated. Such devices and techniques add cost and complexity to hologram production systems. Moreover, to help ensure a stable hogel recording environment, a step-repeat approach is often adopted in translating the holographic recording medium or the recording optics with respect to the recording medium. Consequently, additional settling time (on the order of tens of milliseconds as well) is introduced into the recording process. The cumulative recording and settling times prolong the hologram production process, often making it impractical for certain applications. Moreover, the mechanical systems used to step the system, bring (or allow) the system to come to a stop, and repeat can be very complex.

Using pulsed lasers in hologram production devices can mitigate or solve many of the aforementioned problems associated with CW laser use. Due to the different physics of pulsed laser operation, a small frame pulsed laser is able to generate higher light intensity than its CW counterparts. For example, small frame frequency doubled Nd:YAG pulsed lasers can generate 1.1 mJ of energy during a 35 ns long pulse at 532 nm. This corresponds to approximately 31.4 kW of power during the pulse. In contrast, a typical CW Nd:YAG laser produces approximately 4 W of power. Because high exposure intensity is possible using pulsed lasers, the required exposure time to generate a hologram can be reduced significantly. While tens of milliseconds is typically needed for CW laser hologram recording, the tens of nanoseconds pulse duration of a pulsed laser is adequate for pulsed laser hologram recording. Decreasing the exposure time by six orders of magnitude means that the frequencies of both the movement of the hologram recorder components and environmental vibration are too low to generate any noticeable effect on interference pattern generation. The mechanical stability requirements restricting the CW laser based hologram recorder are completely relaxed. Consequently, the recorder design can be significantly simplified and the cost of the hardware is reduced.

Thus, although the presently described systems and methods are not limited to the use of pulsed laser systems, the use of pulsed laser systems will be emphasized in this description. Moreover, the systems and methods described herein can make use of the devices and processes for recording holograms using pulsed lasers as described in U.S. patent application Ser. No. 10/167,759 entitled "Pulsed-Laser Systems and Methods for Producing Holographic Stereograms," naming Craig Newswanger, Pankaj Lad, Robert L. Sitton, Qiang Huang, Michael A. Klug, and Mark E. Holzbach as inventors, (the '759 application) which is hereby incorporated by reference herein in its entirety.

FIG. 1 is a schematic diagram of a pulsed laser based hologram production device that can take advantage of, for example, the hologram production techniques described in the '759 application, the '041 application, and the '088 patent. and can be used for the digital hologram displays described herein. Hologram recorder 100 is designed to rapidly produce horizontal-parallax-only (HPO) or full parallax holograms and particularly holographic stereograms. The main components of hologram recorder 100 are pulsed laser 110, synchronized holographic recording material translating system 120, object beam optical system 130 and reference beam optical system 140. In other implementations, the recording material is kept stationary, and object beam optical system 130 and reference beam optical system 140 are translated with respect to the recording material. In still another implementation, object beam optical system 130 and reference beam optical system 140 are combined together so that only one optical system need be translated.

Although hologram recorder 100 is shown having only one pulsed laser, hologram recorder 100 can in general be constructed with several different pulsed lasers (or one pulsed laser capable of providing laser output at multiple wavelengths) to enable recording of multi-color holograms and holographic stereograms. Thus, the systems and methods described in the aforementioned '088 patent can be extended to the use of pulsed laser hologram recorders such as recorder 100.

An example of a pulsed laser 110 that can be used in hologram recorder 100 is the 212 Series (e.g., model 212S-532-3500) diode-pumped, Q-switched pulsed Nd:YAG laser manufactured by Lightwave Electronics Corporation of Mountain View, Calif. Those having ordinary skill in the art will readily recognize that a variety of different pulsed lasers can be used in hologram recorder 100. In general, the laser wavelength, laser pulse power, and laser pulse energy of a particular pulsed laser system are the determining factors for use in a hologram recorder.

For multiple color, e.g., red-green-blue (RGB), laser pulses, a variety of different laser systems can be used including diode-pumped solid state lasers, flash-lamp pumped solid state lasers, and dye lasers. Typical solid-state laser gain media include ruby, sapphire, garnet, alexandrite, Titanium sapphire (Ti:sapphire), Neodimium:Yttrium Aluminum Garnet (Nd:YAG), and Neodimium:Yttrium Lithium Fluoride (Nd:YLF). In one example, optical parametric oscillators (OPOs) are used to down convert laser frequency. For example, a frequency tripled Nd:YAG laser can produce 355 nm pulses which in turn drive a tunable OPO to produce pulses ranging from 410 nm to 690 nm. In another example, a Nd:YLF laser produces 1047 nm pulses which are then converted through second-harmonic generation to 523 nm pulses used to drive an OPO. Output from the OPO at 898 nm and 1256 nm can be frequency doubled through second harmonic generation to yield 449 nm and 628 nm pulses respectively. In another example, Raman converters can be utilized. The output of a pulsed alexandrite laser (e.g., 764 nm pulses) is frequency doubled through second harmonic generation to yield 382 nm pulses. These pulses then pass through a Raman cell including Deuterium Hydride (HD) gas. Careful selection of the input pulse can yield, for example, output laser pulse of 443 nm, 527 nm, and 650 nm. Other types of pump lasers, e.g., Nd:YAG and Nd:YLF, and other gases for the Raman cell, e.g., Deuterium ($D_2$) or methane ($CH_4$), can be used. Moreover, some combination of all or some of these techniques and lasers can be used to produce the desired pulse wavelengths.

The pulsed laser beam produced by pulsed laser 110 is split into object and reference beams by the beam splitter C1, typically a polarizing beamsplitter cube. The polarizations and relative intensities of the object and reference beams (i.e., the beam ratio) are controlled by retarders P1 and P2, typically half-wave plates.

The object beam is then expanded and collimated by a collimator formed through the combination of lenses L1 and L2. Next, the object beam is reflected by beamsplitter cube C2 into spatial light modulator (SLM) SLM where the object beam wavefront is intensity modulated. Spatial light modulator SLM as illustrated is a reflective SLM which rotates the polarization state of the object beam. In general, a variety of different SLMs can be used including, but not limited to, a transmissive LCD panel, a reflective LCD panel, an optically addressed LCD panel, a digital micro-mirror array, film, or a transparency. The SLM typically receives image input via a video cable from a computer system (not shown). Additionally, multiple SLMs can be used having images generated in parallel by multiple central processing units or computer systems. Thus, the response time of the SLM is typically an important parameter. Examples of SLMs for use in hologram recorder 100 include the Digital Direct Drive Image Light Amplifier (D-ILA®) series of reflective LCD devices manufactured by the Victor Company of Japan, Ltd. (JVC). Additionally, a single multiple color SLM can be used, or multiple SLMs can be used (typically one SLM for each beam color). The images displayed on the SLM, and thus the images used to intensity modulate the object beam, are typically computer graphics images (either rendered or converted images of real objects) designed and/or processed for recording as holograms.

The modulated wavefront is relayed and filtered by the lens pair L3 and L4 and aperture A1 to then form an image on a band-limited diffuser or an anisotropic diffuser BLD. Note that, in general, the diffuser can be located in a variety of different positions throughout the system. The image then passes through a Fourier transform lens FFL thereby-generating the desired object beam wave front at the holographic recording material positioned on recording plate RP. Note that although hologram recorder 100 is shown using lens pair L3 and L4, to, for example, remove undesired effects such as, but not limited to, high frequency image components such as pixel or grid artifacts that resulted from an SLM display with pixels, a variety of different optical systems can be used.

In reference beam optical system 140, the reference beam is transmitted through path length matching optics (mirrors M1, M2, M3, and M4) and illuminates the reference beam-shaping aperture A2. Path length matching optics are used to adjust the path length of the reference beam path to match that of the object beam, or to at least bring the two paths within a distance of each other that is less than or equal to the coherence length of pulsed laser 110. For some pulsed lasers, the coherence length can be on the order of several millimeters. The image of shaping aperture A2 is then relayed via reference beam relay optics L5 and L6 to the holographic recording material at recording plate RP. As shown, the angle of incidence of the reference beam with respect to the surface normal of the holographic recording material at recording plate RP is preferably oblique, and further preferably approximates 45°. In other examples, the angle of incidence of the reference beam with respect to the surface normal of the holographic recording material is approximately 0°. A variety of different techniques can be used steer either or both of the reference beam and the object beam. For example, the devices and techniques of the aforementioned '088 patent can be utilized. Finally, the object and reference beams are superimposed at the holographic recording material on recording plate RP producing the interference pattern required for hologram (or hogel) recording.

In the example of FIG. 1, the optics systems 130 and 140 are generally kept stationary during the operation of hologram recorder 100 while the synchronized holographic recording material translating system 120 is used to reposition the holographic film located at recording plate RP for each hogel that is recorded. Synchronized holographic recording material translating system 120 is typically a computer controlled x-y translation system. In one example, synchronized holographic recording material translating system 120 includes a 300AT series positioning system manufactured by the Daedal Division (Irwin, Pa.) of the Parker Hannifin Corporation and an ACR2000 position controller manufactured by Acroloop Motion Control Systems, Inc., of Chaska, Minn. In systems where the holographic recording material is kept stationary, similar devices and techniques can be used to translate object beam optical system 130 and reference beam optical system 140 with respect to the recording material. Moreover, devices and techniques for synchronizing device translation, SLM computer graphics image display, and laser pulsing are described in greater detail in the aforementioned '759 application.

It should be noted that it is well within the skill of one having ordinary skill in the art to substitute different optical components for many of the specific optical components shown in FIG. 1. For example, a variety of different polarizing devices, beam splitters, collimating optics, lenses, SLMs and mirrors can be used in hologram recorder 100. Additionally, although FIG. 1 illustrates a system for producing reflection holograms, systems for producing transmission holograms using the devices and techniques described above can also be implemented.

A variety of different types of holographic recording material can be used with the techniques discussed herein. One example of the type of recording materials that can be used is photopolymerizable compositions (photopolymers) because of their image recording capabilities and their relative ease of use. Photopolymers include a wide range of materials that undergo physical, chemical, or optical changes through selective polymerization when exposed to light. Photopolymers capable of recording volume phase holograms include those developed by Canon Incorporated (based on polyvinyl carbazole), Polaroid Corporation (based on polyethylene amine/acrylate), Daiso Co. Ltd., and E.I. du Pont de Nemours and Company (based on polyvinyl acetate and polymethyl methacrylate). Those having ordinary skill in the art will readily recognize that a variety of different photopolymer compositions can be used in the practice of the inventions described herein. Nevertheless, preferred photopolymer films are provided by E.I. du Pont de Nemours and Company under the trade designations, for example, OmniDex™ 706, OmniDex™801, HRF-800X001-15, HRF-750X, HRF-700X, HRF-600X, and the like. Numerous other holographic recording materials can be used, depending in part on the nature of the hologram production technique. Those materials include, but are not limited to: specialized photopolymer systems used for rewritable systems, such as the polymer systems using two independently polymerizable chemical systems (low-refractive index matrix precursors and high-refractive index photopolymerizable monomers) developed for holographic storage by InPhase Technologies; traditional photorefractive materials such as bismuth silicon oxide ($Bi_{12}SiO_{20}$), lithium niobate ($LiNbO_3$), barium titanate ($BaTiO_3$), cadmiun sulfide (CdS), gallium arsenide (GaAs) and indium phosphide (InP); classes of chalcogenide compounds; thermally-deformable materials; liquid crystals; polymer-dispersed liquid crystals; and optically addressable SLMs.

The basis unit for the digital hologram displays described herein is the holographic element, or "hogel". Each hogel is capable of storing the intensity and direction for millions of light rays, as distributed by angular orientation. A hogel is formed through the interference of a transformed beam of light with a (usually collimated) reference beam. In the simplest form, the transform would be a Fourier transform of a greyscale mask or image, accomplished via the placement of the mask at the back focal plane of a lens. As described in the '088 patent, introduction of a digital optical element is typically coincident with the mask that produces band-limited diffusion of the focused beam at the transform plane. This element can be used to create a diffuse spot of light of any desired shape or size. A reference beam, typically composed of a non-diffuse, but nominally planar wavefront, may be introduced into the diffuse spot from any direction in order to form the hogel interference pattern. The hogel is an interference pattern that can reproduce the specific angles and intensities of the data beam when illuminated with a replica of the reference beam or the phase conjugate of the reference beam. Thus, the data beam contains the perspective, intensity, and possibly also the phase information for the hogel area on the hologram plane, and that information is encoded through interference with the reference beam. As either the film or the optics are indexed (e.g., translated), an array of hogels is recorded or "written" in the medium through successive interference with the reference beam. The reference beam angle may change for each hogel so that the final array may be illuminated with a variety of different light sources including diverging point sources or a converging beam, if desired, without distortion of the image. This also enables a single point source illumination beam to substantially fulfill the Bragg condition for each hogel on replay.

The various devices and techniques for hologram production described above can be used to display numerous different types of scenes. However, the holograms, devices for use with holograms, and related techniques described in the present application will emphasize environment visualization applications. The term "environment" is meant to encompass any sort of environment in which a person might find himself and/or representations thereof, e.g., terrain, bodies of water, maps, buildings, campuses, facilities, vehicles, and other larger-scale physical spaces. In other examples, the subject matter being visualized might be smaller scale environments, such as the inside of a device or apparatus, or interior features of animals or humans. Thus, the subject matter of the present application will focus on the visualization of an environment based on realistic data describing that environment, and combined with some other information (e.g., iconic information, data display, interface information) to enhance visualization of and/or interacting with the environment.

Environment visualization typically begins with "realistic" source data describing the environment. For human environments, that data can be captured using RADAR, LIDAR, SONAR, conventional imaging (e.g., analog or digital photography/videography) or the like. Similarly, information used in the design or construction of environments, such as CAD data, can also be used. For environments within a device or biological specimen, data gathering techniques used such as x-rays, sonograms, CT scans, PET scans, MRI imaging, Electrical Impedance Tomography (EIT), laser scanning, etc. can be used. Those having ordinary skill in the art will readily recognize numerous different data sources and data gathering techniques that can be used to provide realistic source data of a particular environment for use in producing holograms of that environment.

Moreover, any number of different types of three-dimensional (3D) data can be used as the source data for producing a hologram. Examples include: point clouds, polygons, splines, voxels, 2D perspective photographs, or any combination of these. Specific 3D data formats can be used such as: 3D Studio MAX (.3ds, and .max files); Alias Maya binary or ASCII (.mb and .ma files); Alias Triangle Files (.tri); VRML 2.0 ASCII (.wrl files); OpenFlight (.flt files); Drawing Exchange Format (.dxf files); Digital Elevation Model (DEM) format; GeoTIFF format; and the like. Thus numerous existing datasets, including GIS and CAD-based datasets can be used to produce holograms of environments.

To illustrate the process of producing a hologram from such realistic environment data, the following example can be considered. A dataset of an environment, e.g., a set of LIDAR point cloud data acquired by an aircraft flying over a city, is the starting point. The point-cloud data is converted from its original data format, e.g., the aforementioned DEM format, to another format more convenient for hologram production, e.g., the VRML format. Parameters are then selected to achieve the desired digital hologram format, size, and resolution, and the rendering process for the hologram can begin. As described, for example, in the aforementioned '088 patent, a camera is modeled within the data usually placed at the zero elevation plane in the case of disk and standard formats. Forward and backward-looking lenses on the modeled camera generate an image of the data from the unique perspective of the camera's position. The virtual camera is indexed across a grid of positions, the number of which corresponds to the final resolution of the digital hologram. The perspective images, rendered are downloaded sequentially to an optical recorder, such as the one schematically illustrated in FIG. 1, in order to produce the digital hologram. In the optical recorder, each image is displayed on an SLM that is illuminated with laser light. Light transmitted by the SLM is focused to a small spot on photosensitive material such as a photopolymer film. A second laser beam, introduced from the opposite side of the material, intersects the same spot simultaneously. Where these two beams intersect, a small hologram is recorded into the material. This hologram is called a holographic element or "hogel," analogous to a "pixel" in a digital photo or on a computer screen. The hogel size can vary, depending on the desired resolution and size of the final digital hologram. If red, green, and blue lasers are used in the optical recorder, a full color hogel is recorded, similarly to the method by which full-color is produced on a computer screen.

FIGS. 2A–2D illustrate some examples of the holograms and related techniques described in the present application. As note above, any of the production techniques described can be used to produce the holograms illustrated in FIGS. 2A–2D. FIGS. 2A–2D provide examples of holograms of environments where realistic data is combined with some other information to further enhance visualization of the environment.

Figure 2A:
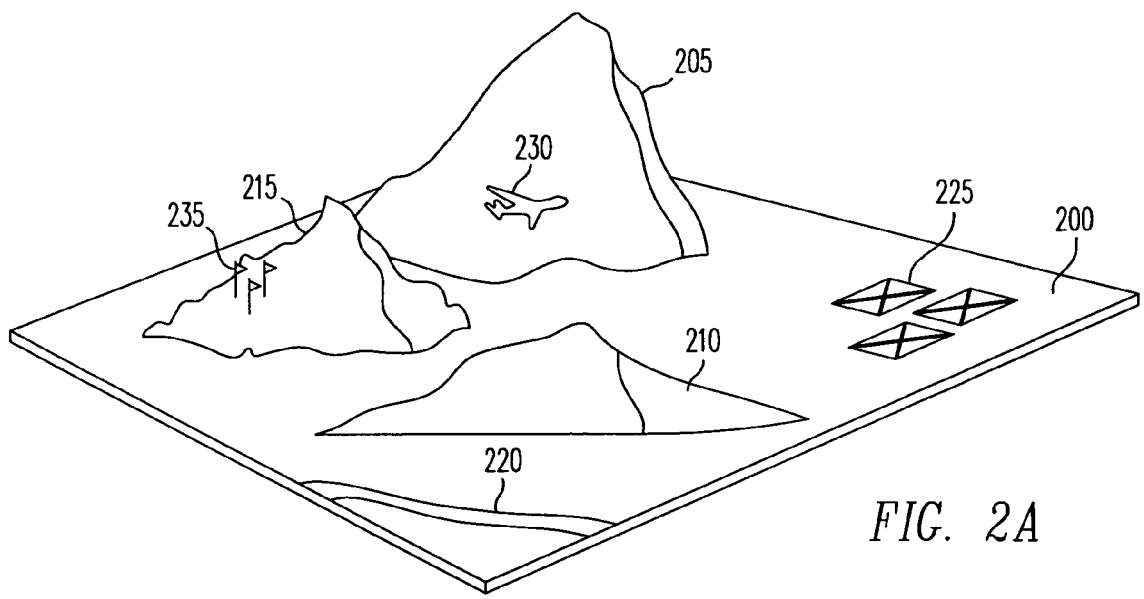
FIGS. 2A–2D illustrate some examples of the holograms and related techniques described in the present application.

FIG. 2A illustrates a holographic stereogram 200 that is formed using both data derived from some measurement or scan of an environment and iconic or representational data used to enhance visualization of the overall scene. In this example, the data derived from measurement of an environment is used to produce actual geographic features such as mountains 205 and 215, hill 210, and river 220. The source of such data can be, for example, satellite imaging, radar data, GIS data, or the like. Representational data has also been used to produce icons such as troop division symbols 225, aircraft symbol 230, and enemy position symbols 235. Thus, the environment data is combined with the iconic data to produce a single model which is then rendered to produce the digital hologram as described above.

Digital hologram 200 can be displayed in a variety of configurations, depending on the selected format, the desired application, and the manner in which the hologram was produced. Illumination can be integrated into a display system resulting in a portable, self-contained display. Conversely, a stationary, dedicated display station can be provided that enables repeated use and consistent quality. The digital hologram image is reconstructed via illumination with a point light source that is directed onto the recording material from a specific angle and distance, as dictated by the format design. In general, when a digital hologram is illuminated, each hogel replays the light angles and their associated information simultaneously, producing a three-dimensional image that appears to float above and/or below the film surface. The image is visible over a 95-degree conical angle, enabling group viewing and a large amount of parallax. Some digital hologram formats, such as the disk, a-frame, and pyramid, can be rotated as well, providing a 360-degree view of the scene.

The illuminating light source can be a halogen spotlight, a light-emitting diode (LED) illuminator, or a small laser. Sunlight or a flashlight can be used to illuminate the hologram, but illumination with a designated light source results in more consistent imagery with fewer distortions. Still other light sources, such as LCD projectors, can be used to simultaneously illuminated the hologram and project additional information. Thus, in one example, troop division symbols 225 are not part of hologram 200, but are instead generated by a computer system and projected onto the surface of hologram 200 by an LCD projector (not shown). Such techniques can provide animation (e.g., troop movement) and/or real-time updates (e.g., changes in troop strength) as desired.

In embodiments where the hologram is produced by an updateable display device, such as those described in the aforementioned '041 application, hologram features such as troop division symbols 225, aircraft symbol 230, and enemy position symbols 235 can also be updated to illustrate changes in location with respect to the environment, changes in number, changes in status, etc.

Thus, holograms such as hologram 200 can be used in numerous environment visualization applications including: anti-terrorism prevention planning, urban terrain visualization an planning, special events planning, key facilities management (including information for logistics planning), data fusion, bomb damage assessment, scenario modeling for disaster response, simulation of potential terrorist-initiated events, subterranean visualization, rescue and evacuation routing, briefings and mission planning, force protection, deception and camouflage planning, battlefield representation, and intelligence surveillance reconnaissance (ISR) visualization.

In such applications, digital holograms can be used to show actual versus planned movements, alternative strategies (with overlay or multi-channel animated holograms) or alternative deployments. This technology can be placed in facilities and/or forward deployable in field situations. Fusion of data for applications to areas such as common operating picture (COP) can easily be accomplished using digital holograms. Input data from varied sources including SAR/LIDAR, satellite orthographic images, DTED, and multi-spectral integration, and photogrammetry extractions among others can be integrated with modeled data, such as threat domes and flight paths to produce rich, intuitively-viewable 3D images using the digital hologram technology. More static elements, such as terrain maps, can be integrated with overlay digital holograms showing more dynamic elements to provide a 4D representation of an operation plan or mission briefing. Moreover, the 3D nature of the holography enhances collaboration in planning and decision-making where complex 3D information must be considered.

Additional applications for digital holography such as force protection, special events planning, and key facilities monitoring are significant. These can include ingress and egress visualization of above ground and underground structures, and critical incident response plans that are 3D-intensive. For example, a portable 3D urban atlas can utilize pages comprised of digital holograms, breaking down a city environment into block-areas, and combining realistic visualization of the environment with supporting information. Port and airfield security can similarly be visualized, including the intrinsic volumetric components of airspace and underwater access and delineation.

Battlefield representation applications for digital holography include visualization of natural or complex urban terrain, co-located MIL-STD-2525 symbology, and the integration of dynamic overlay holograms to show changes quickly, clearly, and intuitively. Moreover, the digital hologram can be used as a "photonic sandbox," allowing for 3D placement of critical resources and entities in the planning and review of operations. Intelligence Surveillance Reconnaissance Visualization (ISR) can also benefit from digital hologram output. UAV-based sensor data, quickly relayed and triangulated, can be issued in holographic form rapidly for review and decision-making. Multi-spectral data can be integrated in the hologram or in the form of overlays, so that the orientation and positioning with respect to visual GIS data is readily apparent. This form of presentation is quickly interpreted, and provides an excellent archival record of the acquired data.

Figure 2B:
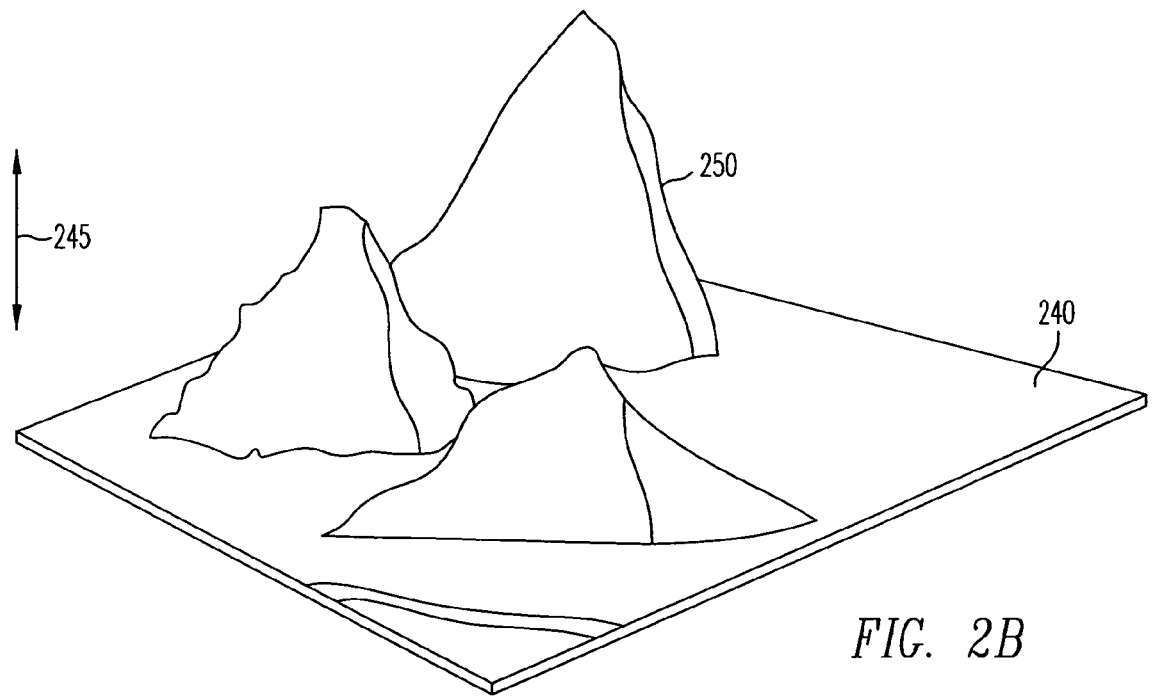

FIG. 2B illustrates another holographic stereogram 240 that is formed using measurement derived environment data. However, in this example that data is further processed to enhance visualization. Thus, the data was been stretched or expanded along axis 245 (e.g., the z-direction) to exaggerate certain features or relationships among environment features. As compared with the mountain 205 of FIG. 2A, mountain 250 has had its height exaggerated. In still other examples, only certain environmental features are so processed. Numerous other examples of data processing applied to the underlying environment data will be known to those having skill in the art.

Figure 2C:
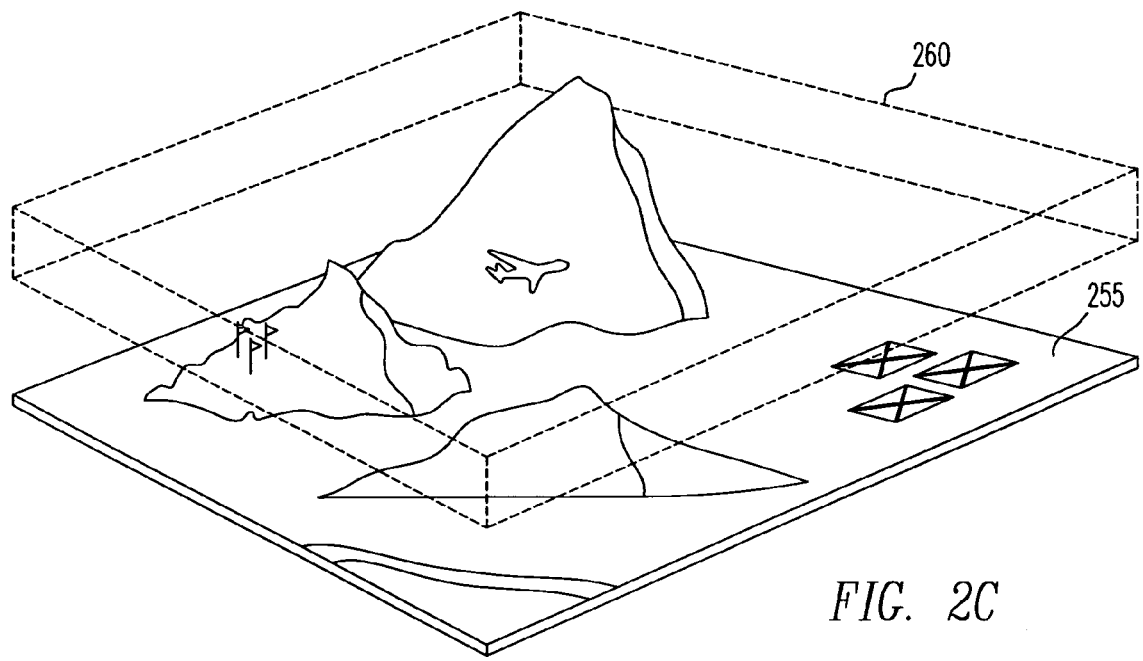

FIG. 2C illustrates yet another example of additional information that can be included in the hologram. Hologram 255 includes a transparent colored band 260 illustrating, for example, altitude information. This particular technique provides an intuitive way to provide additional information into the scene. As in the examples above, the additional iconic information is rendered and included in the CGI model that is used as the basis for hogel rendering. Numerous variations of this element will be known by those having ordinary skill in the art. For example, more than one altitude band can be illustrated, weather features or atmospheric phenomena can be illustrated, and the like.

Figure 2D:
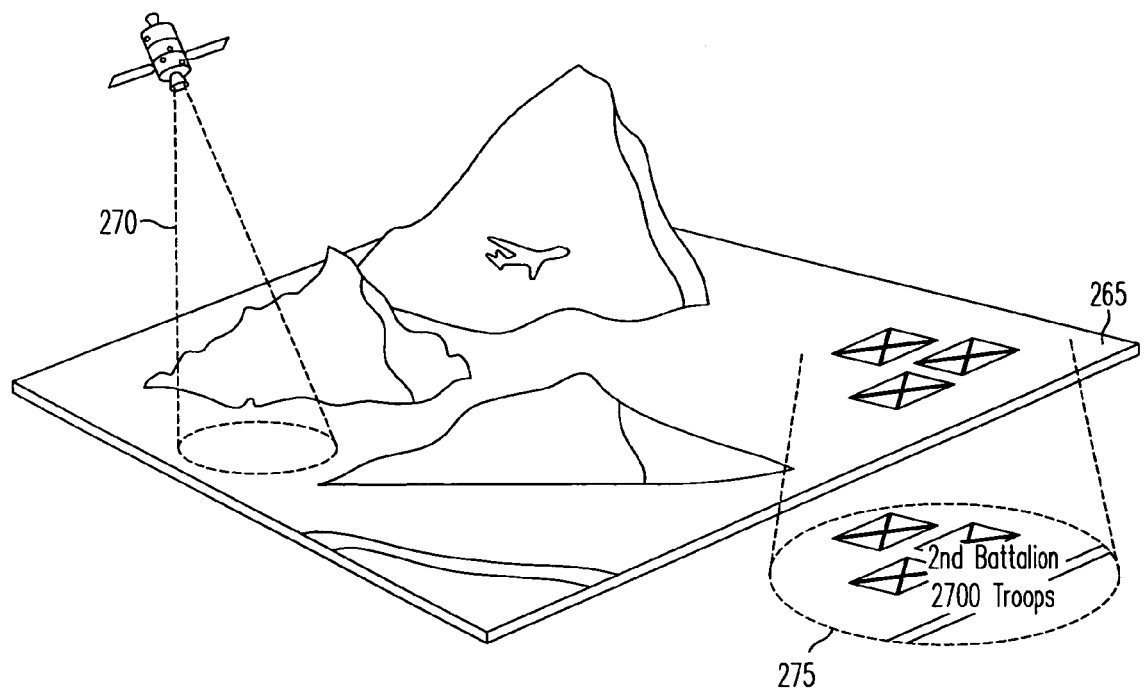

FIG. 2D illustrates still other features that can be included in a hologram used for environment visualization. In this example, hologram 265 includes a feature 270 illustrating a satellite imaging, e.g., radar or photographic, shadow. Such a feature can be updated to track the movement of the satellite. Similar ground-based features can also be included, such as ground-based radar installation shadows/fields-of-view, threat domes, flight paths, and the like. In addition to displaying 3D imagery, hologram 265 can also simultaneously displaying covert or hidden information 275 that is either machine readable, human readable, or a combination of both. Augmented secret data can be made visible from one or more very narrowly defined viewing locations as illustrated. The result is "keyhole" positions into which the viewer must place their eyes exactly. If an eye isn't at one of the keyholes, the secret data would be so obscured that it is essentially invisible (becoming background noise). A similar technique can be used to provide security features. A hologram can contain certain hogels having randomly different illumination angles as compared to the main hogels of the hologram. Only when the security hogels are illuminated correctly ("queried") with the correct illumination "key" would the image come together to form a coherent whole. Similarly, one or more special hogels can be included for which the individual hogel images themselves employ watermark data. Additional optical equipment and computers can read and decode this information. The hologram can also be recorded with data that can only be read under laser illumination of a particular frequency, and when normally illuminated with white light becomes unnoticeable or indecipherable.

Figure 3A:
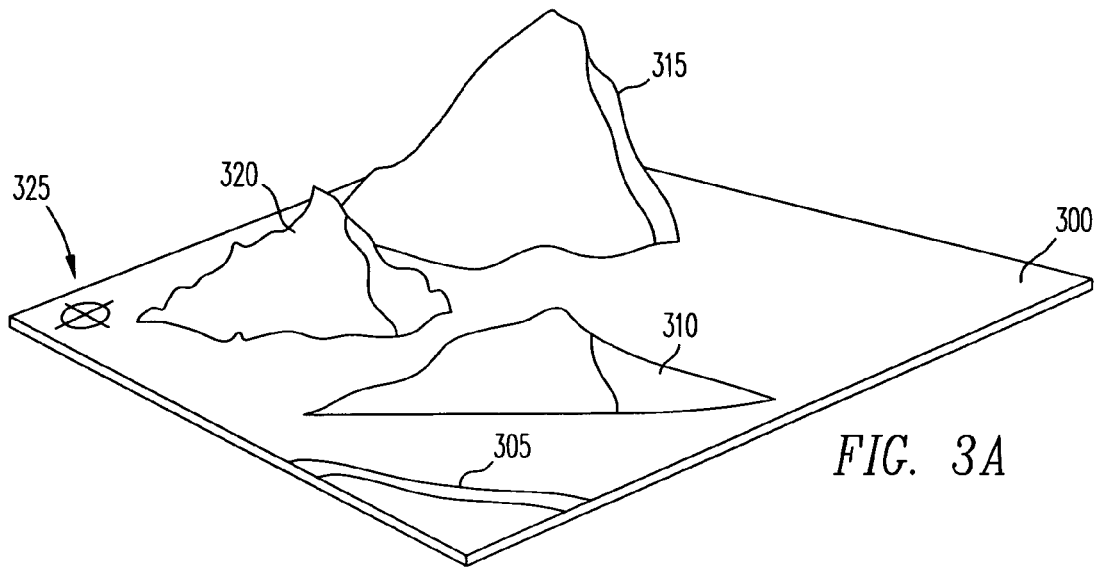
FIGS. 3A–3C illustrate yet another example where two holograms are used in conjunction with each other.
Figure 3B:
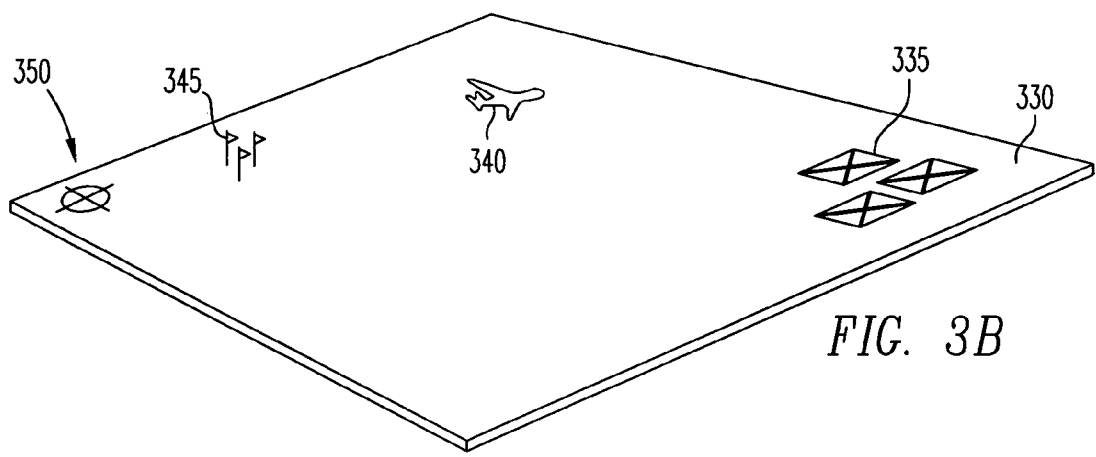
Figure 3C:
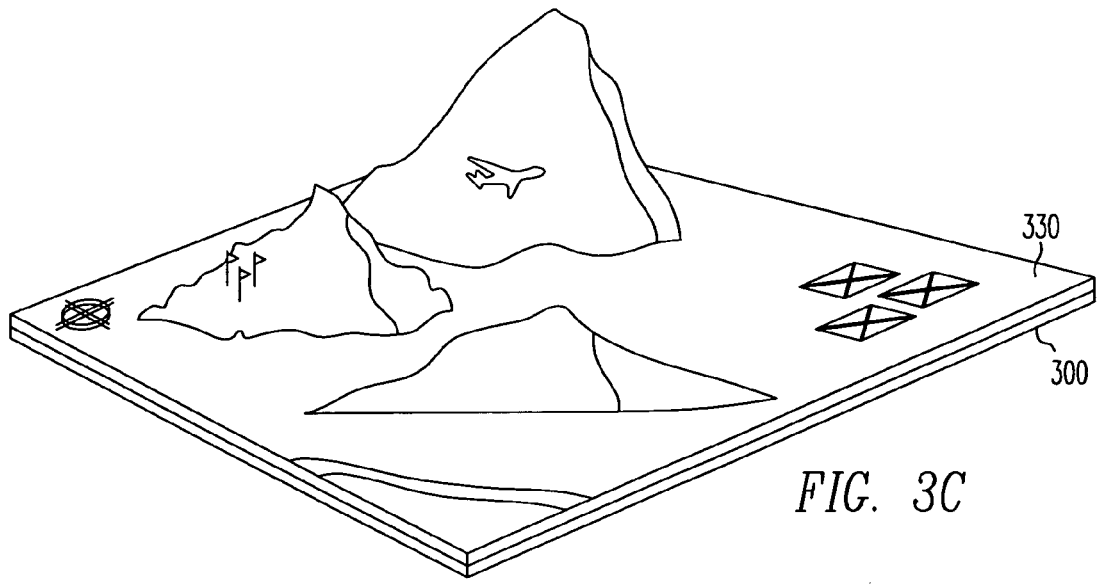

FIGS. 3A–3C illustrate yet another embodiment where two holograms are used in conjunction with each other to mutually enhance visualization of an environment. A shown in FIG. 3A, hologram 300 includes environment features 305–320, similar to those in FIG. 2A. Hologram 300 also includes registration mark 325 used to facilitate alignment of hologram 300 with some other display device such as hologram 330 of FIG. 3B. Note that registration mark 325 could be formed as a holographic image, i.e., data included in the CGI model used to render the hogels of hologram 300, or separately applied to hologram 300 in some fashion. Hologram 330 includes iconic images 335–345 similar to those illustrated in FIG. 2A. Hologram 330 also includes a registration mark 350 to facilitate alignment of the hologram with another display. FIG. 3C shows the two holograms combined to produce a composite set of images.

In general, holograms 300 and 330 can be formed using any of the technologies described above. For example, hologram 300 might be formed using a non-updateable technology because the source data used to render the scene displayed in the hologram is relatively static. On the other hand, hologram 330 can be formed using an updateable technique because it includes scene elements that should be updated frequently, e.g., the position of aircraft icon 340. Thus, hologram 300 can be produced as an overlay that is placed on top of an updateable holographic display that produces hologram 330. In one embodiment, registration marks 325 and 350 are rendered using 3D data, and each mark presents part of a 3D object so that proper alignment of holograms 300 and 330 displays the complete 3D object. In addition to the registration features used for proper hologram alignment. One or both of the holograms can be produced so that images properly offset to account for any dimensional differences in or relationships between the respective media. In other examples, both holograms are produced using non-updateable technologies. In still other examples, more than two separate holograms are used.

Where multiple separate holograms are used, two or more holograms can be prepared such that different illumination sources can be used. In one application of such a technique, the holograms generally produce the same images, but because they are illuminated from different directions, people or objects that might block one light source (and affect image reconstruction) will not block other light sources. Such multiple reconstruction source illumination reduce the chance that interaction with the hologram impacts its usability. Thus, for example, shadow casting can be reduced or eliminated by using more than one source of overlapping illumination to reconstruct more than one overlapping holographic recordings of the same information in the same display space. If one of the illumination sources is interrupted in any way, other uninterrupted sources serve to still provide some image source although at reduced brightness.

FIGS. 2A–3C present examples of battlefield visualization, but as discussed above, any type of environment can be visualized and combined with iconic or representational data using the techniques described herein.

To further enhance use of and user interaction with holograms such as those illustrated in FIGS. 2A–3C, haptic interfaces are employed. Haptics refers to the sense of touch, as optics does to the sense of sight. As described in the present application, haptics refers to technology that allows a user to feel objects and data represented by a computer system coupled to a haptic interface. Haptics can be broken into three conceptual areas: force feedback, tactile feedback, and proprioception. With force feedback, a user feels forces supplied by a haptic interface. Most force feedback devices are mechanical and present forces to a user through motors. Tactile feedback refers more to our sense of touch across our skin through mechanoreceptors. Tactile feedback is often accomplished in computing systems through pin arrays that are pneumatically or electronically activated to present a user with different skin sensations, and/or subtle and sometimes rapid variation in force feedback to simulate tactile feedback. Proprioception is our ability to sense where our body is located in space through internal musculoskeletal forces. While numerous different haptic interfaces can be used in conjunction with holograms, the examples of the present application will focus on force-feedback interfaces.

In combining haptics with holography, a user interacts with a holographic image using a stylus, glove, or other manual implement configured to provide force feedback to the user, that is to resist the user's effort to move the implement. The amount of force feedback is generally dictated by a model of the physical characteristics of the holographically displayed subject matter (including size, shape, texture, material give, etc.), and by the position of the haptic interface implement relative to the image. This allows a user to feel, and in some cases modify, computationally specified shapes in the haptic workspace. The haptic workspace is registered with the spatial image displayed by the hologram so that the force feedback accurately coincides with the features of the hologram. The combined workspace is referred to as a coincident workspace, or a coincident display volume where a user can see, feel, and interact with synthetic objects that exhibit many of the properties one expects of real objects.

Figure 4:
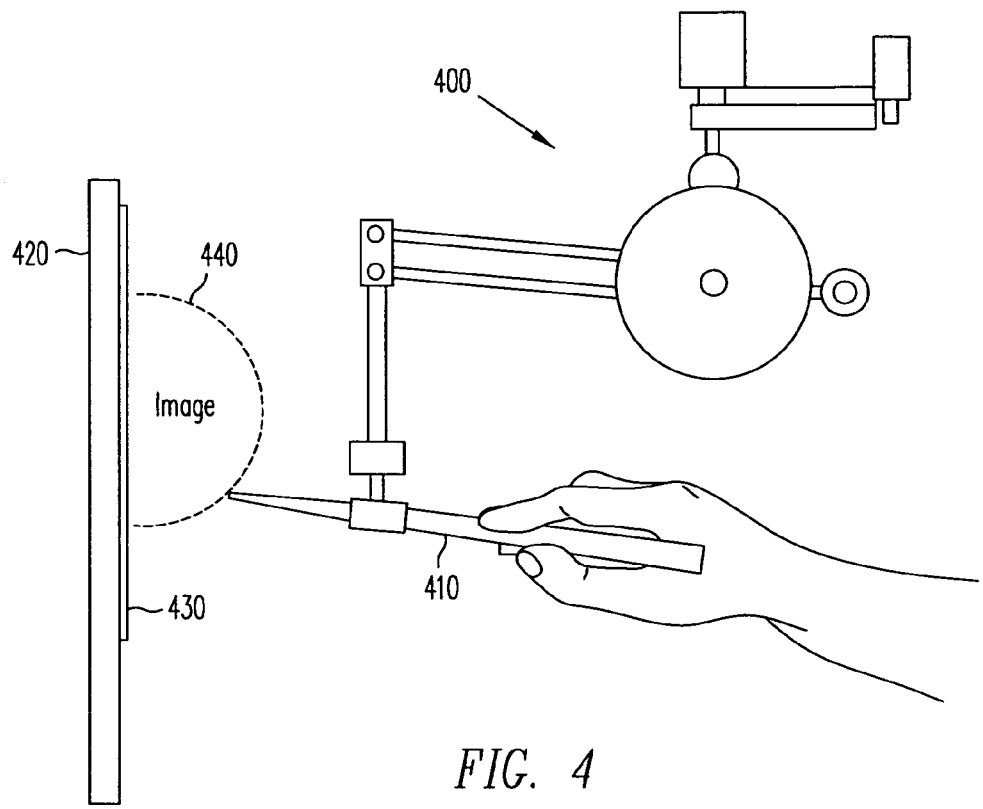
FIG. 4 illustrates a simplified figure of a holographic and haptic, or holohaptic, interactive system.

FIG. 4 illustrates a simplified figure of such a workspace. Image 440 is generated and displayed when hologram 430 (mounted on a suitable display base 420) is properly illuminated. In general, any type of hologram and corresponding illumination can be used, e.g., reflection, transmission, or edge lit holograms. In some embodiments, edge lit holograms may be preferred because the user and the haptic interface (400) are not likely to block illuminating light, thereby interfering with image reconstruction. The image 440 has an apparent position and volume within a view zone visible to the user. Interaction between the user and image 440 occurs at the tip of stylus 410, which is part of haptic interface 400. Examples of haptic interfaces such as interface 400 include the PHANTOM® haptic devices produced by SensAble Technologies, Inc. of Woburn, Mass.

In one embodiment, the mechanical linkage of haptic interface 400 provides a range of motion approximating full arm movement pivoting at the shoulder. Three degrees-of-freedom are provided for both positional sensing (approximately 0.02 mm resolution) and force feedback (up to 20 N force). Encoders on the device provide positional information, while three separate servo motors provide force feedback. Although the device shown in FIG. 4 illustrates a stylus 410, other pointing devices and features can be included. For example, stylus 410 can include one or more buttons, scroll wheels, etc. to provide additional control signal input by a user. Such an "encoder stylus" can enable measurement of an additional 3 degrees of positional sensing (pitch, roll & yaw), and/or allow interaction with a computer system coupled to the haptic interface as described below. In another example, a finger sled (a thimble like device for receiving a users finger) or a handle can be used instead of stylus 410. In still other examples, more sophisticated haptic interfaces can provide torque feedback in three rotational degrees of freedom, e.g., in yaw, pitch, and roll directions.

Thus, a user of haptic interface 400 "feels" image 440 as they move stylus 410 along image features via the force feedback provided by interface 400 through stylus 410. The user sees the stylus tip interacting with the holographic image 440 while feeling forces that result from contact with a haptic model of the image that represents the surface, texture, and/or deformation characteristics specific to presented image 440. More specifically, within each haptic control loop cycle, the location of the stylus is reported, and its collision with all objects is determined. If the stylus is in contact with an object, the force in the direction of the object surface normal is computed as well as forces from specified surface properties (friction, damping, texture, etc.). Force contributions from all objects are added to global drift or damping forces, and the result is displayed to the user. Object state is updated as necessary.

Figure 5:
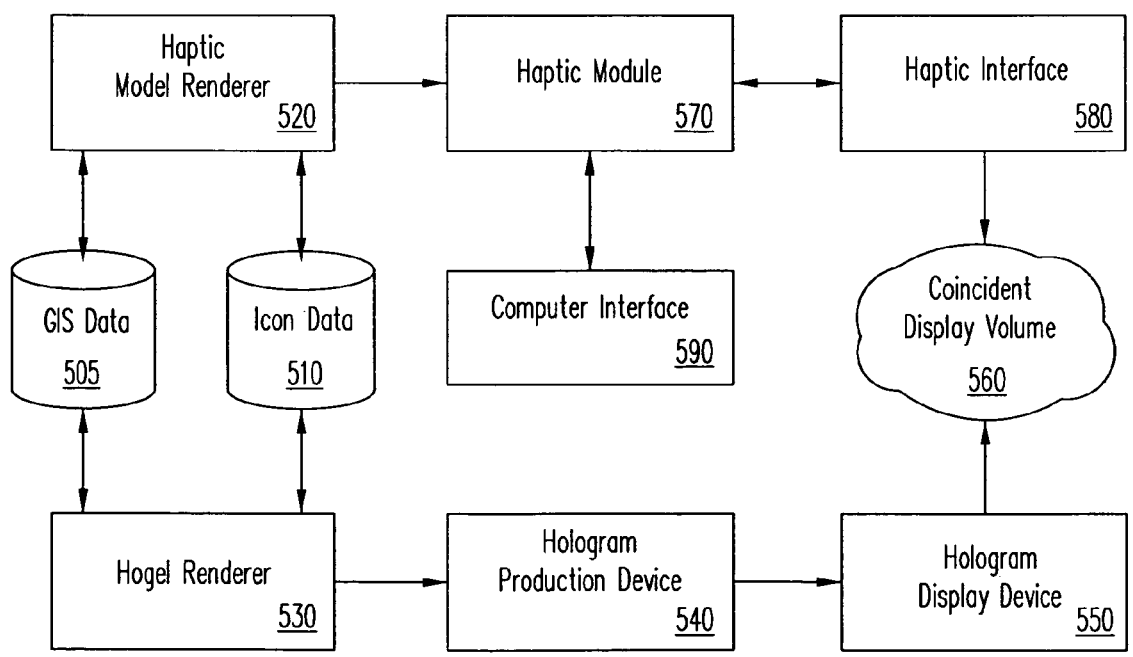
FIG. 5 provides a block diagram illustrating various components of a holohaptic interactive system.

FIG. 5 provides a block diagram illustrating various components of a holographic and haptic, or holohaptic interactive system. In addition to enhancing the usability of holograms such as those illustrated in FIGS. 2A–3C, the holohaptic interactive system (HIS) also enables holograms to become highly intuitive computer interfaces for a multitude of uses, including environment visualization and GIS-type applications. Since the haptic interface automatically delivers a stream of accurate real-time digital positioning and directional orientation coordinates as a user "feels" points on or in the hologram, this stream of point coordinates can be used to: reference back and call up correlated, e.g., GIS database, information; activate position-related audio or video streams for display on a computer system; mark positions or paths of interest for determining sightlines, calculating distances, visualizing simulated courses of ingress or egress, visualizing registered multi-spectral acquired data; and the like.

Holohaptic interactive system 500 preferably makes use of the same source data for both the holographic display and the haptic "display". In the example illustrated, the source data includes environment or GIS data 505 and iconic or representational data 510. When combined to generate a computer model or scene, the two types of data can be used to produce holograms like those illustrated in FIGS. 2A–3C. Thus, source data 505 and 510 are used by haptic model renderer 520 and hogel renderer 530. Numerous variations of the system illustrated in FIG. 5 can be implemented. In one embodiment, the portions of the final hologram associated with icon data 510 are not intended to provide haptic feedback, and so haptic model renderer 520 need not use icon data 510. In another example, icon data 520 is translated by haptic model renderer 520 into other haptic information, e.g., an icon representing an enemy position is haptically displayed using a series of vibrations or a particular texture that does not directly correspond to the icon visually displayed but provides some desired force feedback. Alternately, the icon data is used by haptic model renderer 520 to insert a "point of interest" haptic element so that a user of the haptic interface would be signaled to take some other action, e.g., press a button on the interface stylus, to retrieve additional information. Source data 505 and 510 can be in a data format immediately usable by one or both of renderers 520 and 530, or further data conversion may be required.

In some embodiments, e.g., where the source data is in a format immediately usable by haptic module 570, haptic model renderer 520 can be eliminated. In general, haptic module 570 performs force modeling based on a computationally represented haptic model describing the model's position, geometry, bulk deformation, and tactile properties. Haptics module 570 correlates the instantaneous physical position of the pointing device haptic interface 580 (stylus tip position, finger sled position, glove position, etc.) with the haptic model to derive the force imparted to the interface when the pointing device is in contact with the model, and displays that force via the haptic interface 580. Hologram production device 540 generates a hologram based on the hogels rendered by hogel renderer 530. In embodiments where hologram production device 540 produces non-updateable holograms, hologram display device 550 is typically the combination of the output of hologram production device 540, e.g., a hologram recorded in a holographic film, suitable mounting mechanisms, and one or more light sources for displaying the hologram. In embodiments where hologram production device 540 produces updateable holograms, it may be combined with hologram display device 550 into a single unit or device. Other variations will be known to those having ordinary skill in the art. The components of holohaptic interactive system 500 provide the force and visual images to coincident display volume 560.

The haptics rendering is displayed on haptic interface 580 which allows us to precisely track position and rotation at the center of the gimbal joint at the end of the linkage. Haptic interface 580 is used to display a force vector that depends on positional and rotational encoder output from the interface. Haptic module 570 can simultaneously provide computer interface 590, allowing a user to: control the haptic module and/or interface; view a CGI representation of the haptic model; receive display volume related information as described above; calibrate the haptic interface; enter commands for object creation and deletion, activation and deactivation; setting global drift forces and global viscosity; specifying surface damping and friction (static and kinetic); creating textures on objects; position querying; and the like. Haptic module 570 can also compute geometry changes imparted to the haptic model by the user's manipulation of haptic interface 580 if such changes are allowed. Information about such changes can be communicated to visual display devices, such as hogel renderer 530, hologram production device 540, hologram display device 550, and computer interface 590 to provide update hologram or computer interface display.

The haptic modeling techniques used herein are well understood by those having ordinary skill in the art. Currently implemented computational haptics are able to render both the feel of a material and its bulk properties with reasonable fidelity. Moreover, haptic devices such as the aforementioned PHANTOM® haptic devices typically include software, e.g., software development kits (SDKs) and/or application programming interfaces (APIs), that enables developers to integrate haptics with existing third-party applications and new applications and provides an extensible architecture that offers a framework for multiple layers of capabilities. Two examples for the PHANTOM® haptic devices are: (1) the Haptic Device API which is a foundation layer of the 3D Touch SDK and provides developers with low-level access to the haptic device; and (2) the GHOST SDK, which provides a "physics of touch" engine, to handle complex computations and allow developers to deal with simple, high-level objects and physical properties like location, mass, friction, and stiffness.

In one embodiment, haptic module 570 is implemented on a conventional computer system, and computer interface 590 is used for haptic/hologram calibration. Software executing on haptic module 570 allows a haptic model, e.g., a VRML model, to be loaded and properly oriented for use in a calibration procedure. The calibration procedure aligns the model with the hologram to create a usable holohaptic session. Calibration of the haptic model and the hologram is typically achieved by defining three points on the haptic model that correspond to the same three points on the hologram. For example, a point of the hologram can be selected by positioning the tip a haptic interface stylus at the point and pressing a button on the stylus or computer interface 590. Similarly, a corresponding point can be selected on the haptic model using a GUI displaying a CGI representation of the haptic model on computer interface 590. Once the two sets of points are defined, the application transforms the haptic model coordinate system such that the points selected on the model align with the points selected on the hologram. To ensure proper calibration, it is generally desirable that: (1) haptic model geometry and the hologram geometry match as closely as possible—thus hologram parameters are typically designed into the haptic model geometry and any distortion, such as that produced by imperfect conjugation, is accounted for; (2) the hologram production process be distortion-free—i.e., factors such as film shrinkage, optical magnification, and placement of multiple holograms be addressed; and (3) the haptic workspace be isometric along all axes—even slight curvatures of space are quite distracting when the visual and haptic displays are coincident.

A related procedure that might need to be performed is calibration of the haptic interface itself. Commercially available haptic interfaces such as the aforementioned PHANTOM® haptic devices typically include such functionality. For example, calibrating the device can include placing the stylus in a known or "home" position and instructing associated software to perform the desired calibration steps.

In still another example, a more automatic haptic/hologram calibration method is implemented. A rectangle (or other suitable shape) is included in the computer model that represents the hologram and is scaled exactly to match a physical hologram. The corners of the computer model rectangle are matched up exactly with the hologram corners, so that once the haptic device is calibrated in its fixed position, the hologram-to-computer-model calibration would not require any additional steps.

Once the haptic interface is calibrated with the displayed hologram, the two can be used together for a variety of visualization and simulation purposes. With the addition of computer interface 590, still other information and scene control can be included in the holohaptic interactive system. Where computer interface 590 is used to also interactively display CGIs of the haptic model (or a comparable 3D CGI model of the scene) various model display parameters can be adjusted such as lighting position, lighting synchronization with camera view, scale factors for point-to-point measurements, and the like. Computer interface 590 can be configured to display a CGI view of the model as "seen" from the tip of the haptic interface stylus. Similarly, as series of views along a path traversed by the stylus can be captured to form a movie of the viewed path, e.g., a flight path. When stored as a series of points along which a stylus traveled, data for such movies can become misaligned with the corresponding model. Consequently, one or more "universal" points of reference can also be stored with the flight path data so that the original path can be properly aligned with the scene.

In one example, points of interest (POI) provide a way to associate information with a designated point in the 3D scene. POI can be created, deleted and modified. Defined POI can be used to display context-sensitive information, provide distance between POI and define specialized views between POI. POI can also be queried in view-apparent terms, that is when the stylus tip of the haptic interface passes over the POI or is within range of the POI position the POI is queried. When a POI is queried, associated aspects of a displayed CGI model can be changed. For example, the color of the POI is changed and the name of the POI is displayed on computer interface 590 when the POI is activated. In still another example, selection of a POI is performed by pressing a stylus button.

POIs can be used as the basis for a variety of different modes of operation. For example, POIs can be used to query information associated with point by loading a hyperlink associated with a POI in a web browser. POI selection can similarly activate other programs, audio data, video data, and the like. POIs can be used in a sight line mode to provide a way to define a camera orientation based on POI positions. Two POIs are selected to define a sightline. The position of the first selected POI becomes the camera position, and the position of the second selected POI becomes the position at which the camera is pointed. In a query distance mode, the distance is calculated between two POIs and scaled according to a real-world scale factor.

Another feature that can be controlled using computer interface 590 is the ability to haptically snap to a POI. Haptic snapping provides a way to enforce a constraint on haptic interface movement and can assist in locating a POI position in 3D space. Activation of haptic snapping is done in a view-apparent manner the same as POI querying. Haptic interface movement is then constrained to a certain point or line until a "break-away" force is applied by the user.

Most of the examples described above use a single point of interaction, e.g., the tip of a stylus, between the haptic interface and the haptic model. In some embodiments, multiple graphical points associated with the CGI display of the scene (as seen from computer interface 590) can be used for "collision detection" between the haptic interface and the haptic model. For example, a wire frame box is displayed on computer interface 590 in place of typical cursor to illustrate the location of the stylus tip. The center of the stylus corresponds with the center of this box. The holohaptic interactive system simultaneously detects when any of the edges of the box have collided with scene geometry. Collision response can be indicated by changes in computer interface 590, e.g., a change in color of the box edges that have collided, or an informational dialog box displayed with current collision information. Such a collision "box" can take arbitrary shape or size, e.g., a vehicle, person, icon, or other shape, and the point in the box associated with the stylus tip can be arbitrarily defined. Moreover, the force feedback properties associated with the box can be varied. For example, initial collision of the box and a model surface might lead to light force feedback, while collision between the point corresponding to the stylus tip and the model surface produces a more substantial force feedback. Numerous further variations and refinements will be known to those having ordinary skill in the art.

Figure 6:
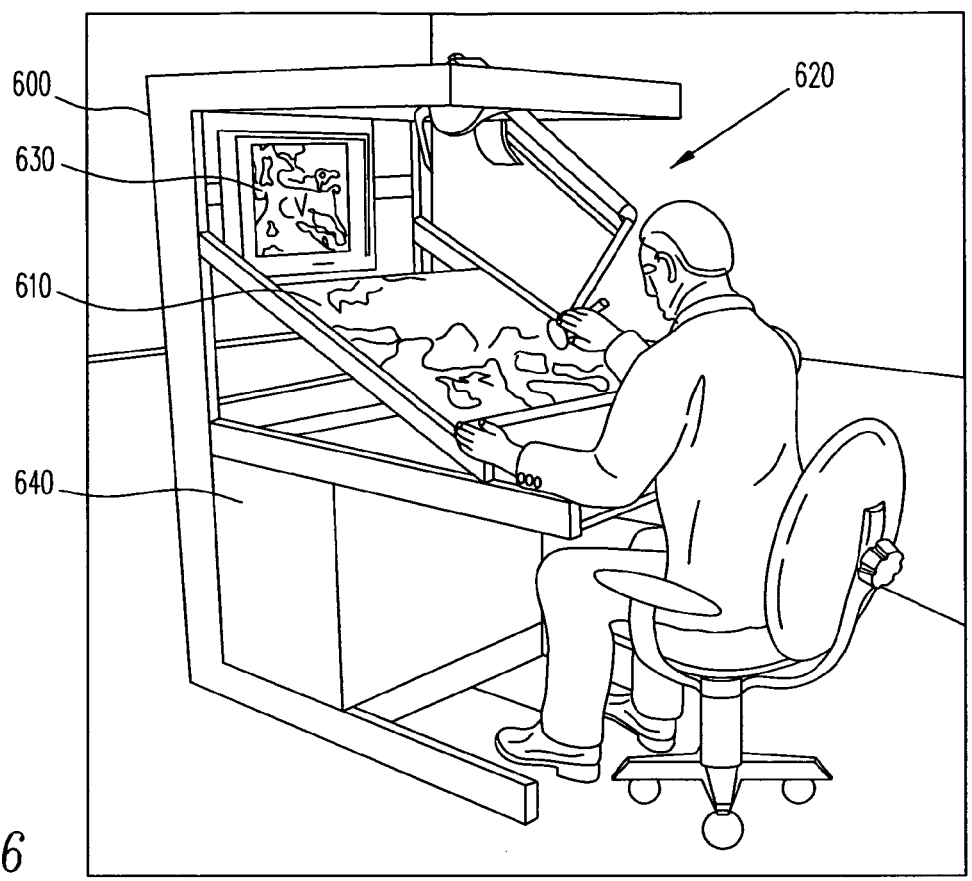
FIG. 6 illustrates an example configuration of a holohaptic interactive system.
Figure 7:
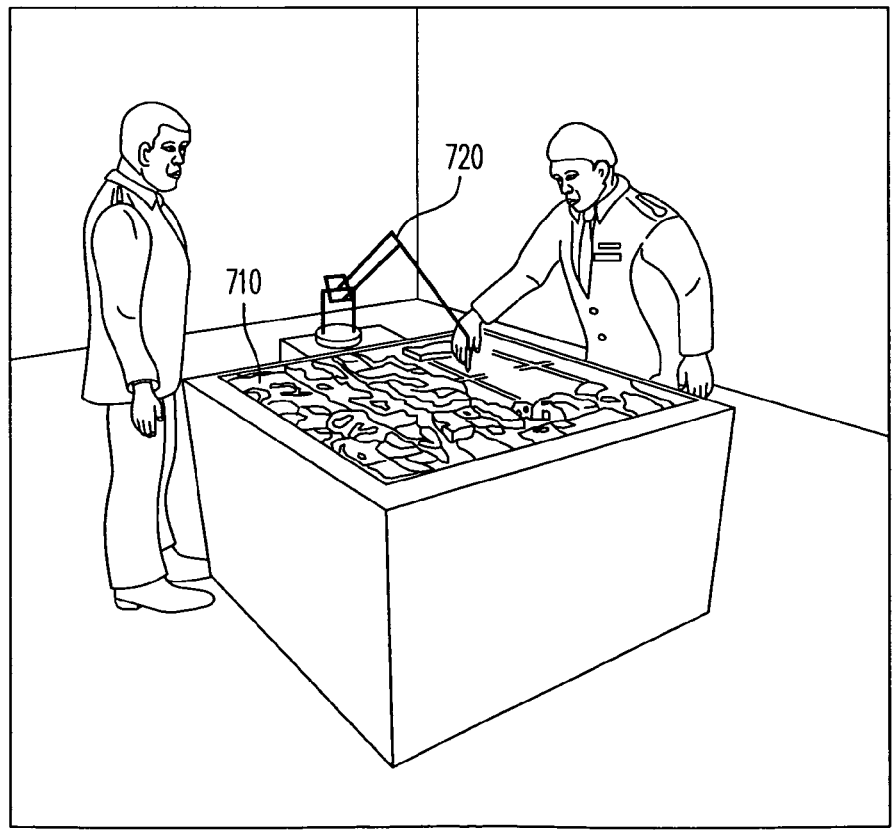
FIG. 7 illustrates another example configuration of a holohaptic interactive system.

FIGS. 6 and 7 illustrate to example configurations of holohaptic interactive systems. Holohaptic interactive system 600 includes a hologram 610 that is located within the system and appropriately illuminated. Haptic interface 620 is mounted in the system to provide full range of motion and interaction with hologram 610. Display 630 provides a computer interface, as described above, to enable additional information to be gathered, processed, accessed, and displayed. Using other computer interface devices, e.g., keyboard, mouse, etc. (not shown), holohaptic interactive system 600 can be further operated. In one embodiment, haptic interface 620 can toggle between a haptic mode where it operates as described above, and a computer interface mode, where it operates as, for example, a mouse for an underlying computer system. Various other system components 640 can include: computer systems in support of system 600, e.g., haptic modules, rendering modules; communications equipment; hologram production equipment; and hologram display equipment, e.g., light sources.

FIG. 7 illustrates another embodiment of a holohaptic interactive system 700. Holohaptic interactive system 700 includes a hologram 710 that is mounted/displayed in a table-top fashion. Haptic interface 720 is mounted next to hologram 710 to provide full range of motion and interaction with the hologram. Note that in the example of FIG. 7, haptic interface 720 includes a finger sled instead of a stylus. In this example, computer interface information can be projected directly onto the display surface, instead of using a separate monitor, or not provided. Various other system components can be included: computer systems in support of system 700, e.g., haptic modules, rendering modules; communications equipment; hologram production equipment; and hologram display equipment, e.g., light sources.

As can be seen from FIGS. 6 and 7, holohaptic interactive systems can be an effective tool for displaying and interacting with holograms providing environment visualization. The HIS can create great value in many ways beyond existing virtual reality (VR) systems. The holohaptic human/computer interface is as useful as the most sophisticated and intuitive VR systems without the additional encumbrance (and cyber-sickness-inducing image update lag) of headgear such as VR goggles or glasses. Digital holograms are inherently intuitively understood and naturally accommodate multiple viewers. HISs can be designed to accommodate one or more users. In a multi-user environment, interested viewers could take turns with the haptic interface while others discuss together and interact with the hologram and view data screens containing auxiliary information associated with the holographic image. Multiple haptic interfaces could also be used simultaneously.

There are numerous ways in which multiple existing input and output technologies could be used to augment such systems. For example, video can be integrated to display related visual GIS database information, and voice recognition can be integrated in order to signal when to mark points or as a convenient way to query a GIS database. Correlated GIS metadata such as information about a building, street addresses, distance to ground, names of residents or property owners, etc. can either be played as text-to-voice audio or displayed as a text overlay on one of the video screens. Orthorectified multispectral satellite images can be applied to 3D elevation data and switched or blended on command. The haptic probe itself can also be used to output or playback moves or simulate viscosities and textures which the user could feel—such as when moving through aerial or terrain regions of acute vulnerabilities or dangers. Line-of-site from a building or movement through a street could also be simulated by use of the HIS interface. The haptic device can be programmed to recognize gestures such as repeated tapping on a position or circling in the air—which could trigger database or display functions such as mode changes. An orientation-sensitive stylus-based tip with a toggle switch can also be utilized to trigger selections.

Although a single digital hologram can contain up to several terabytes of complex 3D visual information containing one or many volumetric data sources displayed at any scale and resolution appropriate to task, multiple holograms containing different datasets with different scales and resolutions may be needed for any particular project. Consequently, the ability to switch holograms within the working environment is desirable. The working environment should be designed with active haptic interface space in front of a replaceable fixed-position hologram and a standardized fixed illumination source for proper hologram display. Holograms placed into the environment should have proper identification and initial 3D position and scale registration/calibration that could be highly automated using one or more physical and optical methods. For example, the identification could be accomplished with a bar code label, and physical pin-registration would ensure precise and accurate registration positioning for most cases. Optional optically-read fiducial marks could also be added. Regardless of the registration method, an initial user interaction calibration check procedure would be defined to ensure proper setup, and the whole task of switching holograms and registering them will be fast, easy, and reliable.

Those having ordinary skill in the art will readily recognize that a variety of different types of optical components and materials can be used in place of the components and materials discussed above. Moreover, the description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method comprising:
   combining first image data with second image data, wherein the first image data comprises realistic information describing a real environment, and wherein the second image data comprises representational information describing at least one of a feature of the real environment and a real object interacting with the real environment;
   rendering data for a plurality of hogels using combined first and second image data; and
   forming a plurality of hogels in a holographic recording material, wherein the plurality of hogels are formed using the data for the plurality of hogels.

2. The method of claim 1 further comprising:
   providing data for at least one of the plurality of hogels to a spatial light modulator;
   intensity modulating an object beam from a laser with the spatial light modulator; and
   exposing a portion of the holographic recording material to an interference pattern formed by a reference beam from the laser and the object beam from the laser.

3. The method of claim 1 further comprising:
   calculating a fringe pattern corresponding to data for at least one of the plurality of hogels.

4. The method of claim 1 wherein the realistic information describing the real environment is derived from at least one of: a plurality of measurements of the real environment, and design information describing the real environment.

5. The method of claim 4 wherein the plurality of measurements of the real environment include at least one of: RADAR data, LIDAR data, SONAR data, photographic data, video data, x-ray data, sonogram data, CT scan data, PET scan data, MRI imaging data, electrical impedance tomography (EIT) data, and laser scanning data.

6. The method of claim 1 wherein the realistic information describing the real environment includes at least one of: terrain information, hydrological information, map information, building information, campus information, facilities information, vehicle information, and biological specimen information.

7. The method of claim 1 wherein the representational information describing at least one of a feature of the real environment and a real object interacting with the real environment includes at least one of: an icon, a symbol, a color, a shape, a texture map, a path, a shadow, and a volume.

8. The method of claim 1 wherein the combining first image data with second image data further comprises:
   combining the first image data with the second image data and with third image data, wherein the third image data comprises information to be selectively viewable by at least one of a user and a machine.

9. The method of claim 8 wherein the forming a plurality of hogels in a holographic recording material further comprises:
   forming at least one of the plurality of hogels in the holographic recording material so that at least a portion of the third image data is viewable from a narrowly defined viewing location.

10. The method of claim 1 further comprising:
    providing a haptic interface in a volume coincident with an image volume of an image produced by the plurality of hogels in the holographic recording material;
    comparing a location of a portion of the haptic interface with a corresponding location in a haptic model of the image produced by the plurality of hogels in the holographic recording material; and
    imparting a force to the haptic interface in response to the comparing.

11. The method of claim 10 further comprising:
    periodically sensing the location of the portion of the haptic interface within the volume; and
    correlating each sensed location with a portion of the image produced by the plurality of hogels in the holographic recording material.

12. The method of claim 10 further comprising:
providing a computer interface for displaying a graphical representation of the haptic model; and
selectively displaying, via the computer interface, information related to a scene depicted in an image produced by the plurality of hogels.

13. The method of claim 12 wherein the selectively displaying is controlled, at least in part, by user manipulation of the haptic interface.

14. The method of claim 12 wherein the information related to a scene depicted in an image produced by the plurality of hogels includes at least one of: point of interest information, distance between points information, a view of the haptic model corresponding to the a location of a portion of the haptic interface, flight path information, a webpage, and a cursor corresponding to the a location of a portion of the haptic interface.

15. The method of claim 10 further comprising:
generating the haptic model using at least one of the first image data and the second image data.

16. The method of claim 1 further comprising:
forming a second plurality of hogels in a second holographic recording material, wherein the second plurality of hogels are formed using data for a second plurality of hogels; and
locating the holographic recording material with respect to the second holographic recording material so that a first image volume of an image produced by the plurality of hogels in the holographic recording material overlaps a second image volume of a second image produced by the second plurality of hogels in the second holographic recording material.

17. The method of claim 16 wherein each of the holographic recording material and the second holographic recording material includes a respective registration mark.

18. An apparatus comprising:
a light source that produces a coherent beam;
a beam splitter that splits the coherent beam into an object beam and a reference beam;
an object beam optical system for directing the object beam to interfere with the reference beam at a holographic recording material, wherein the object beam optical system includes a spatial light modulator for intensity modulating the object beam;
a computer coupled to the spatial light modulator and programmed to control delivery of a rendered image to the spatial light modulator, wherein the rendered image includes first image data and second image data, the first image data comprises realistic information describing a real environment, and the second image data comprises representational information describing at least one of a feature of the real environment and a real object interacting with the real environment; and
a reference beam optical system for directing the reference beam to interfere with the object beam at the holographic recording material.

19. The apparatus of claim 18 wherein at least one of the computer coupled to the spatial light modulator and a second computer is programmed to rendering data for a plurality of hogels using combined first and second image data.

20. The apparatus of claim 18 wherein the realistic information describing the real environment is derived from at least one of: a plurality of measurements of the environment, and design information describing the real environment.

21. The apparatus of claim 20 wherein the plurality of measurements of the real environment include at least one of: RADAR data, LIDAR data, SONAR data, photographic data, video data, x-ray data, sonogram data, CT scan data, PET scan data, MRI imaging data, electrical impedance tomography (EIT) data, and laser scanning data.

22. The apparatus of claim 18 wherein the realistic information describing the real environment includes at least one of: terrain information, hydrological information, map information, building information, campus information, facilities information, vehicle information, and biological specimen information.

23. The apparatus of claim 18 wherein the representational information describing at least one of a feature of the real environment and a real object interacting with the real environment includes at least one of: an icon, a symbol, a color, a shape, a texture map, a path, a shadow, and a volume.

24. The apparatus of claim 18 wherein the rendered image includes third image data selectively viewable by at least one of a user and a machine.

25. The apparatus of claim 18 further comprising:
a haptic interface located in a volume coincident with an image volume of an image produced by an interference pattern recorded in the holographic recording material; and
a second computer coupled to the haptic interface and programmed to describe a haptic model of the image produced by the interference pattern recorded in the holographic recording material.

26. The apparatus of claim 25 further comprising:
a computer interface coupled to the second computer for displaying a graphical representation of the haptic model, wherein the second computer is further configured to display via the computer interface information related to a scene depicted in the image produced by the interference pattern recorded in the holographic recording material.

27. The apparatus of claim 26 wherein the display of information is controlled, at least in part, by user manipulation of the haptic interface.

28. The apparatus of claim 26 wherein the information related to a scene depicted in the image produced by the interference pattern recorded in the holographic recording material includes at least one of: point of interest information, distance between points information, a view of the haptic model corresponding to the a location of a portion of the haptic interface, flight path information, a webpage, and a cursor corresponding to the a location of a portion of the haptic interface.

29. The apparatus of claim 25 wherein the second computer is further configured to generate the haptic model using at least one of the first image data and the second image data.

* * * * *